(12) United States Patent
Stafford

(10) Patent No.: US 7,852,261 B2
(45) Date of Patent: Dec. 14, 2010

(54) TRACKING WAVEFORM SELECTION FOR MULTI-FUNCTION RADAR

(75) Inventor: William Kenneth Stafford, Hampshire (GB)

(73) Assignee: BAE Systems PLC, London (GB)

( * ) Notice: Subject to any disclaimer, the term of this patent is extended or adjusted under 35 U.S.C. 154(b) by 280 days.

(21) Appl. No.: 12/159,432

(22) PCT Filed: May 29, 2008

(86) PCT No.: PCT/GB2008/050389

§ 371 (c)(1), (2), (4) Date: Aug. 7, 2008

(87) PCT Pub. No.: WO2008/146046

PCT Pub. Date: Dec. 4, 2008

(65) Prior Publication Data

US 2010/0225526 A1   Sep. 9, 2010

(30) Foreign Application Priority Data

Jun. 1, 2007 (EP) .................................. 07270027
Jun. 1, 2007 (GB) .................................. 0710370.8

(51) Int. Cl.
*G01S 13/66* (2006.01)
(52) U.S. Cl. .......................... 342/195; 342/95; 342/82; 342/137
(58) Field of Classification Search ................. 342/195, 342/90–97, 82, 98–101, 137
See application file for complete search history.

(56) References Cited

U.S. PATENT DOCUMENTS

| | | | |
|---|---|---|---|
| 4,143,373 A * | 3/1979 | Chernick | 342/88 |
| 4,649,390 A * | 3/1987 | Andrews et al. | 342/140 |
| 5,115,246 A * | 5/1992 | Thomas et al. | 342/195 |
| 5,245,347 A | 9/1993 | Bonta | |
| 5,726,657 A * | 3/1998 | Pergande et al. | 342/202 |
| 5,847,675 A * | 12/1998 | Poinsard | 342/81 |
| 6,989,782 B2 * | 1/2006 | Walker et al. | 342/134 |

(Continued)

FOREIGN PATENT DOCUMENTS

GB     2 005 106 A    4/1979

(Continued)

OTHER PUBLICATIONS

International Preliminary REport on Patentability issued in related application PCT/GB2008/050389, Dec. 1, 2009, 7 pages.

(Continued)

*Primary Examiner*—John B Sotomayor
(74) *Attorney, Agent, or Firm*—Pillsbury Winthrop Shaw Pittman LLP

(57) ABSTRACT

The present invention relates to tracking waveforms in radar which minimizes the dwell time and energy in a tracking waveform while maintaining a specified track positional accuracy and consequently velocity accuracy. The present invention provides a method and apparatus for selecting a tracking waveform in a radar apparatus comprising determining a target range rate; determining a signal strength; determining the radiated frequency of the subsequent transmitted tracking waveform; and modifying the energy and pulse repetition frequency used on subsequent tracking waveforms on the basis of the determined target range rate, signal strength and next transmitted tracking waveform frequency.

8 Claims, 3 Drawing Sheets

U.S. PATENT DOCUMENTS 7,046,190 B2 * 5/2006 Steudel ..................... 342/127
7,626,536 B1 * 12/2009 Rihaczek et al. .............. 342/96

FOREIGN PATENT DOCUMENTS

GB 39 26 216 A1 2/1991

OTHER PUBLICATIONS

Notification of Transmittal of International Search Report, International Search Report and Written Opinion of the International Searching Authority issued in related application PCT/GB2008/050389, Sep. 25, 2008, 15 pages.

European Search Report issue in related European application No. EP 07 27 0072, Nov. 6, 2007, 1 page.

British Search Report issued in related British application No. GB0710370.8, Sep. 14, 2007, 1 page.

John Holloway, "Design considerations for adaptive phased-array 'multifunction' radars", Electronics & Communication Enginerring Journal, Dec. 2001, pp. 277-288.

Skolkin, M.I. (Ed), "Radar handbook, Passage" Radar Handbook, New York, NY, 1990, pp. 15.66-15.67.

* cited by examiner

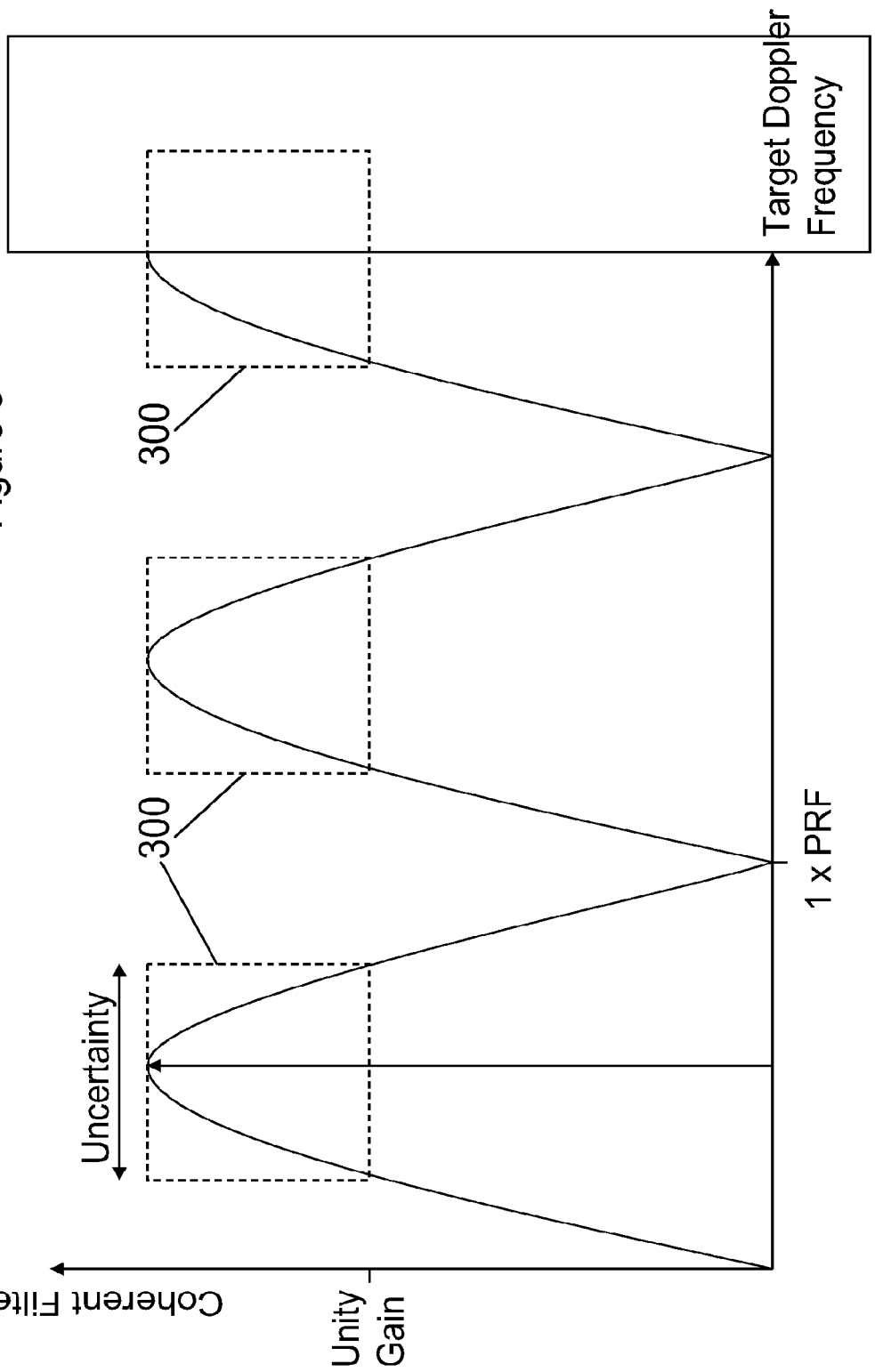

TRACKING WAVEFORM SELECTION FOR MULTI-FUNCTION RADAR

CROSS REFERENCE TO RELATED APPLICATIONS

This is the U.S. National Phase of PCT/GB2008/050389, filed May 29, 2008, which claims priority to British Application No. 0710370.8, filed Jun. 1, 2007, and European Application No. 07270027.1, filed Jun. 1, 2006, both of which are incorporated herein in their entirety by reference.

The present invention relates to tracking waveforms in radar. More specifically, the present invention relates to minimising the dwell time and energy in a tracking waveform whilst maintaining a specified track positional accuracy and consequently velocity accuracy.

In known radar apparatus, a fixed amount of time and energy is used for tracking waveforms, the settings for which are hard-coded in the radar apparatus. Thus, the track accuracy would vary according to the situation and there would be no opportunity to optimise the tracking waveforms.

The present invention provides a method and apparatus for selecting a tracking waveform in a radar apparatus comprising the steps of: (i) determining a target range rate; (ii) determining a signal strength; (iii) determining the radiated frequency of the subsequent transmitted tracking waveform; and (iv) modifying the energy and pulse repetition frequency used on subsequent tracking waveforms on the basis of the determined target range rate, signal strength and next transmitted tracking waveform frequency.

The present invention thus provides a means by which the time and energy resources of the radar can be managed to provide a required level of performance.

The advantage of the present invention is that the amount of time and amount of energy in a tracking waveform can be adjusted according to the situation, in a self-reinforcing manner, to maximise the coherent gain on the target return and to minimise the radar time spent tracking each target.

Specific embodiments of the invention will now be described, by way of example only and with reference to the accompanying drawings that have like reference numerals, wherein:—

FIG. 3 is a graph showing the target coherent gain versus pulse repetition frequency that the embodiment of the present invention is operable to achieve.

Figure 1:
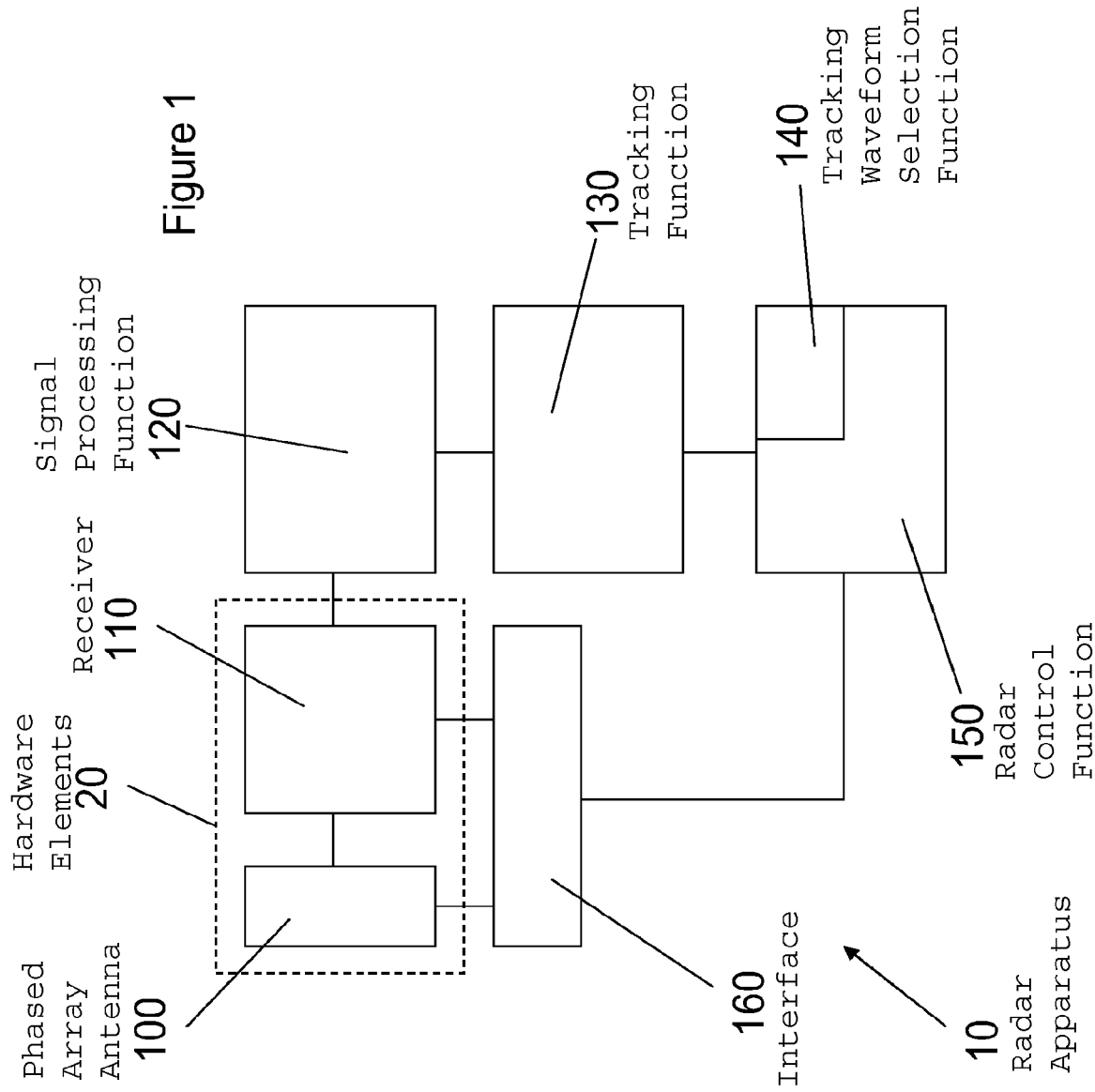
FIG. 1 is a diagram showing the arrangement of components in a radar apparatus according to an embodiment of the present invention.

The specific embodiment will now be described with reference to FIGS. 1 to 3:

In FIG. 1, there is shown a diagram of the hardware and software elements of the radar apparatus of the present invention. The hardware elements 20 of the radar apparatus 10 are a phased array antenna 100 and a receiver 110. The antenna 100 is connected to the receiver 110.

The remaining elements of the radar apparatus as shown in FIG. 1 are embodied in software. Specifically, the receiver 110 is connected to a signal processing function 120, which is in turn connected to a tracking function 130, again and in turn connected to a radar control function 150. A subset function of the radar control function 150 is the tracking waveform selection function 140, the functions and operation of which will be described in more detail below with reference to FIG. 2. The radar control function is then connected to an interface function 160, which in turn is connected to the antenna 100 and receiver 110.

Figure 2:
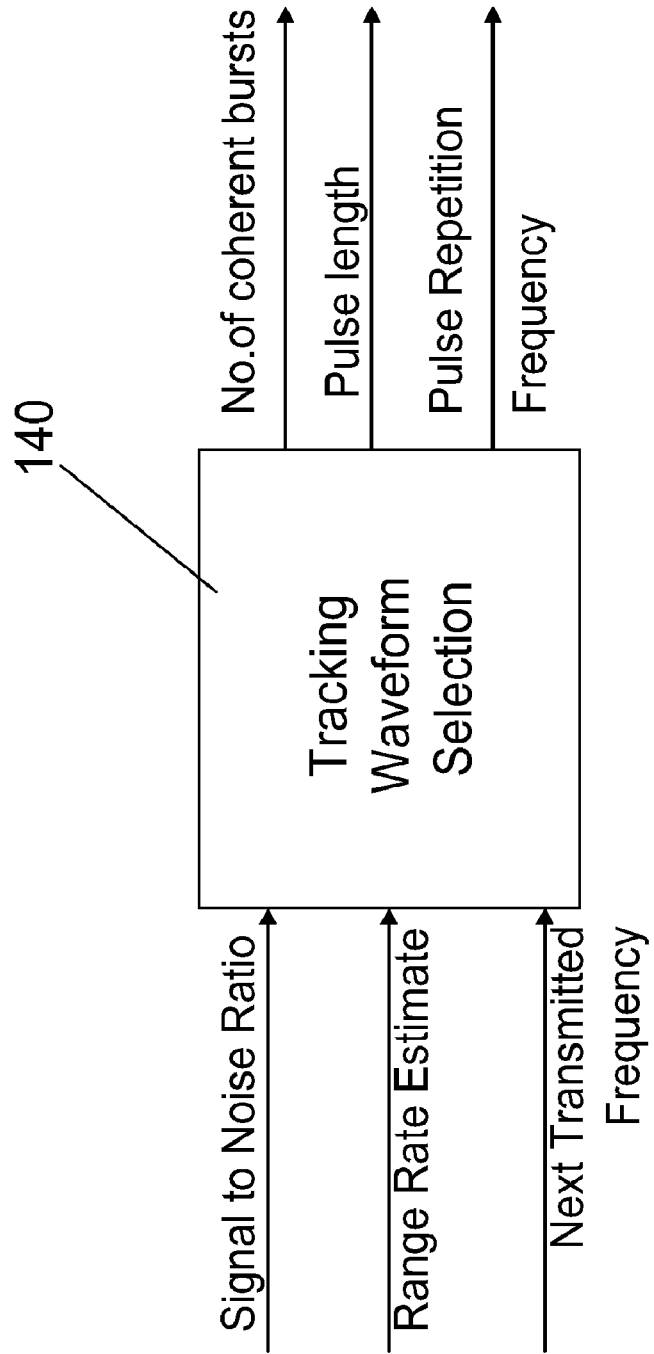
FIG. 2 is a diagram providing more detail of the Tracking Waveform Selection software module of the Radar Control software module.

The tracking waveform selection function 140 is shown in more detail in FIG. 2. The inputs to the tracking waveform selection function 140 are the signal to noise ratio for each track (fed through the tracking function 130 and radar control function 150 from the signal processing function 120), the range rate estimate for each track (estimated by the tracking function 130 and fed through the radar control function 150) and the transmitted frequencies to be used (known and provided by the radar control 150). The range rate is the rate of change of slant range with time (measured, for example, in meters per second). Slant range is the distance between the radar and the target measured along the straight line that directly connects them in three dimensions. Accordingly, target range rate is the range rate of a target measured at the observing radar.

In a preferred embodiment of the invention, the signal to noise ratio for each track is normalised to a fixed pulse length and fixed target range and alpha smoothed before being input into the tracking waveform selection function 140.

The tracking waveform selection function 140 performs two self-reinforcing steps:

1. With the alpha smoothed estimate of signal to noise ratio the total energy content (pulse length and number of pulses) of track waveforms is chosen for the expected target range and so as to achieve the required positional track accuracy 2. With the estimate of the target range rate and its associated error (also output by the tracking function 130), the pulse repetition frequency on track update waveforms which use coherent processing is chosen to maximise the coherent gain on the target return. This acts to reinforce the determination of total energy content since achieving processing gain through a coherent filter will subsequently reduce the total energy requirement.

The tracking waveform selection function 140 then outputs the pulse length, number of coherent bursts and the pulse repetition frequency to be used in the next tracking waveform. This is passed through the radar control 150, via the interface 160, to the antenna 100 and receiver 110.

The graph in FIG. 3 shows the target areas of the graph that the invention is operable to arrange, illustrated by box 300, the dimensions of which are given Doppler frequencies at which the coherent gain is above unity gain. If the returned signals exhibit a coherent gain above unity gain, then an increased signal to noise ratio is exhibited to enable tracking of the target. The invention acts to enable a suitable signal to noise ratio for returned signals whilst using the minimum radar time.

In this way the invention acts to control both the time and energy of radar tracking waveforms in order to minimise the use of radar resources whilst achieving a required level of track position and velocity accuracy.

The skilled person reading the above embodiment of the invention will understand that, although the embodiment describes the use of a phased array antenna, the above invention is applicable to any multi-function radar apparatus.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method for selecting a tracking waveform in a radar apparatus comprising:
   i) determining a target range rate;
   ii) determining a signal strength;
   iii) determining the radiated frequency of the subsequent transmitted tracking waveform; and
   iv) modifying the energy and pulse repetition frequency used on subsequent tracking waveforms on the basis of the determined target range rate, signal strength and next transmitted tracking waveform frequency.

2. A method according to claim 1 wherein the target range rate comprises an estimated target range rate and an associated error.

3. A method according to claim 1, wherein the signal strength comprises a signal to noise ratio.

4. A method according to claim 1, wherein the signal to noise ratio is alpha smoothed.

5. A radar apparatus comprising machine executable instructions for performing the method comprising:
   i) determining a target range rate;
   ii) determining a signal strength;
   iii) determining the radiated frequency of the subsequent transmitted tracking waveform; and
   iv) modifying the energy and pulse repetition frequency used on subsequent tracking waveforms on the basis of the determined target range rate, signal strength and next transmitted tracking waveform frequency.

6. A radar apparatus according to claim 5, wherein, in the method performed by the machine executable instructions, the target range rate comprises an estimated target range rate and an associated error.

7. A radar apparatus according to claim 5, wherein, in the method performed by the machine executable instructions, the signal strength comprises a signal to noise ratio.

8. A radar apparatus according to claim 5, wherein, in the method performed by the machine executable instructions, the signal to noise ratio is alpha smoothed.

* * * * *